(12) United States Patent
Fitch et al.

(10) Patent No.: US 8,237,389 B2
(45) Date of Patent: Aug. 7, 2012

(54) MULTI MODE SAFETY CONTROL MODULE

(75) Inventors: Osa Edward Fitch, Nashua, NH (US); Eddie Williams, Los Osos, CA (US)

(73) Assignee: iRobot Corporation, Bedford, MA (US)

( * ) Notice: Subject to any disclaimer, the term of this patent is extended or adjusted under 35 U.S.C. 154(b) by 834 days.

(21) Appl. No.: 12/269,868

(22) Filed: Nov. 12, 2008

(65) Prior Publication Data

US 2010/0117585 A1    May 13, 2010

(51) Int. Cl.
*G05B 9/02* (2006.01)

(52) U.S. Cl. .................. 318/563; 318/568.12; 180/271; 701/45

(58) Field of Classification Search .................. 318/563, 318/568.11, 568.12, 590, 591; 701/36, 45, 701/52; 180/271; 361/1
See application file for complete search history.

(56) References Cited

U.S. PATENT DOCUMENTS

| | | | |
|---|---|---|---|
| 2,466,375 A | 4/1949 | Carbon | |
| 3,665,945 A | 5/1972 | Ottenstein | |
| 3,952,759 A | 4/1976 | Ottenstein | |
| 4,155,417 A | 5/1979 | Ziems | |
| 4,202,037 A | 5/1980 | Glaser et al. | |
| 4,361,202 A | 11/1982 | Minovitch | |
| 4,897,640 A | 1/1990 | Rapoen et al. | |
| 4,911,192 A | 3/1990 | Hartfiel et al. | |
| 4,986,384 A | 1/1991 | Okamoto et al. | |
| 5,076,382 A | 12/1991 | Vaughn et al. | |
| 5,170,352 A | 12/1992 | McTamaney et al. | |
| 5,198,973 A | 3/1993 | Steutermann | |
| 5,204,814 A | 4/1993 | Noonan et al. | |
| 5,229,941 A | 7/1993 | Hattori et al. | |
| 5,245,422 A | 9/1993 | Borcherts et al. | |
| 5,400,864 A | 3/1995 | Winner et al. | |
| 5,448,479 A | 9/1995 | Kemner et al. | |
| 5,469,356 A | 11/1995 | Hawkins et al. | |
| 5,471,560 A | 11/1995 | Allard et al. | |
| 5,485,892 A | 1/1996 | Fujita et al. | |

(Continued)

FOREIGN PATENT DOCUMENTS

DE    3404202 A1    5/1987

(Continued)

OTHER PUBLICATIONS

Murray, Sean et al., "Continued Research in EVA, Navigation, Networking and Communications Systems", SAE Proceedings, International Conference on Environmental Systems, Jun. 2008.

(Continued)

*Primary Examiner* — Walter Benson
*Assistant Examiner* — Antony M Paul
(74) *Attorney, Agent, or Firm* — O'Brien Jones PLLC

(57) ABSTRACT

A robotic assembly comprises: a mobile vehicle including mechanical components configured to operate the mobile vehicle in a manual mode of operation; a main power circuit for distributing a power signal to the electromechanical components and to external modules; an automation module connected to the mechanical components and operable to control and operate the mechanical components, and a power circuit configured to distribute power to the mechanical components and the external modules; a safety control module connected to the main power circuit, the automation module, and the mechanical components; a mode selector connected to the main power circuit; and emergency stop switches configured to prevent a flow of current to substantially all of the mechanical components and external modules in response to actuation of the emergency stop buttons.

8 Claims, 7 Drawing Sheets

U.S. PATENT DOCUMENTS

| | | |
|---|---|---|
| 5,508,689 A | 4/1996 | Rado et al. |
| 5,511,147 A | 4/1996 | Abdel-Malek |
| 5,555,503 A | 9/1996 | Kyrtsos et al. |
| 5,586,030 A | 12/1996 | Kemner et al. |
| 5,646,843 A | 7/1997 | Gudat et al. |
| 5,652,849 A | 7/1997 | Conway et al. |
| 5,675,229 A | 10/1997 | Thorne |
| 5,698,823 A | 12/1997 | Tanahashi |
| 5,774,069 A | 6/1998 | Tanaka et al. |
| 5,784,023 A | 7/1998 | Bluege |
| 5,906,645 A | 5/1999 | Kagawa et al. |
| 5,984,880 A | 11/1999 | Launder et al. |
| 5,987,364 A | 11/1999 | Le Gusquet et al. |
| 6,037,901 A | 3/2000 | Devier et al. |
| 6,038,496 A | 3/2000 | Dobler et al. |
| 6,059,063 A | 5/2000 | Shimizu et al. |
| 6,072,248 A | 6/2000 | Muise et al. |
| 6,088,020 A | 7/2000 | Mor |
| 6,108,031 A | 8/2000 | King et al. |
| 6,113,395 A | 9/2000 | Hon |
| 6,151,239 A | 11/2000 | Batra |
| 6,169,940 B1 | 1/2001 | Jitsukata et al. |
| 6,186,167 B1 | 2/2001 | Grumstrup et al. |
| 6,198,992 B1 | 3/2001 | Winslow |
| 6,223,110 B1 | 4/2001 | Rowe et al. |
| 6,233,504 B1 | 5/2001 | Das et al. |
| 6,249,215 B1 | 6/2001 | Dilz et al. |
| 6,253,161 B1 | 6/2001 | Arias-Estrada |
| 6,259,980 B1 | 7/2001 | Peck et al. |
| 6,292,725 B1 | 9/2001 | Kageyama et al. |
| 6,341,594 B1 | 1/2002 | Linden et al. |
| 6,356,819 B1 | 3/2002 | Winslow |
| 6,434,462 B1 | 8/2002 | Belvy et al. |
| 6,438,491 B1 | 8/2002 | Farmer |
| 6,442,476 B1 | 8/2002 | Poropat et al. |
| 6,445,983 B1 | 9/2002 | Dickson et al. |
| 6,453,223 B1 | 9/2002 | Kelly et al. |
| 6,480,762 B1 | 11/2002 | Uchikubo et al. |
| 6,535,793 B2 | 3/2003 | Allard |
| 6,549,130 B1 | 4/2003 | Joao |
| 6,577,909 B1 | 6/2003 | McGowan et al. |
| 6,600,986 B2 | 7/2003 | Steinle et al. |
| 6,631,882 B2 | 10/2003 | Mack |
| 6,633,800 B1 | 10/2003 | Ward et al. |
| 6,694,260 B1 | 2/2004 | Rekow |
| 6,751,535 B2 | 6/2004 | Mori et al. |
| 6,760,654 B2 | 7/2004 | Beck |
| 6,778,097 B1 | 8/2004 | Kajita et al. |
| 6,789,014 B1 | 9/2004 | Rekow et al. |
| 6,813,557 B2 | 11/2004 | Schmidt et al. |
| 6,845,297 B2 | 1/2005 | Allard |
| 6,873,911 B2 | 3/2005 | Nishira et al. |
| 6,882,155 B2 * | 4/2005 | Lazzaro .................. 324/418 |
| 6,898,542 B2 | 5/2005 | Ott et al. |
| 6,901,319 B1 | 5/2005 | Nelson et al. |
| 6,902,021 B2 | 6/2005 | Kikuchi et al. |
| 6,945,346 B2 | 9/2005 | Massen et al. |
| 6,950,882 B1 | 9/2005 | Weber et al. |
| 7,010,450 B2 | 3/2006 | Law et al. |
| 7,015,831 B2 | 3/2006 | Karlsson et al. |
| 7,079,021 B2 | 7/2006 | Snowbarger et al. |
| 7,278,567 B2 | 10/2007 | Ferguson et al. |
| 7,305,294 B2 | 12/2007 | Bate et al. |
| 7,894,951 B2 * | 2/2011 | Norris et al. ................ 701/36 |
| 2001/0018640 A1 | 8/2001 | Matsunaga |
| 2002/0032511 A1 | 3/2002 | Murakami et al. |
| 2002/0104300 A1 | 8/2002 | Hunt |
| 2003/0080772 A1 | 5/2003 | Giacomini et al. |
| 2004/0061596 A1 | 4/2004 | Egami |
| 2004/0114584 A1 | 6/2004 | Patz et al. |
| 2004/0158355 A1 | 8/2004 | Holmqvist et al. |
| 2004/0158379 A1 | 8/2004 | Horbaschek |
| 2004/0168837 A1 | 9/2004 | Michaud et al. |
| 2004/0210345 A1 | 10/2004 | Noda et al. |
| 2004/0239490 A1 | 12/2004 | Chiba et al. |
| 2005/0092542 A1 | 5/2005 | Turner |
| 2005/0159870 A1 | 7/2005 | Tohdo et al. |
| 2008/0121097 A1 * | 5/2008 | Rudakevych et al. ....... 89/28.05 |

FOREIGN PATENT DOCUMENTS

| | | |
|---|---|---|
| EP | 0 601 728 | 6/1994 |
| EP | 0 681 230 | 11/1995 |
| EP | 0 835 797 | 4/1998 |
| EP | 1 481 945 | 12/2004 |
| GB | 2 128 842 A | 8/1983 |
| GB | 2 332 286 | 6/1999 |
| GB | 2 339 869 | 2/2000 |
| GB | 2 400 454 | 10/2004 |
| JP | 3-282712 | 12/1991 |
| JP | 8-156641 | 6/1996 |
| JP | 9-258826 | 3/1997 |
| JP | 11149315 A | 6/1999 |
| JP | 2000094373 A | 4/2000 |
| WO | WO 99/05580 | 2/1999 |
| WO | WO 01/26338 A2 | 4/2001 |
| WO | WO 2004/086084 | 10/2004 |

OTHER PUBLICATIONS

Yamauchi, Brian. "All-Weather Perception for Small Autonomous UGVs". In Proceedings of SPIE Defense and Security Conference, Orlando, FL, Mar. 2008.

Lenser, Scott et al., "Practical problems in sliding scale autonomy: A case study". In Proceedings of SPIE Defense and Security Conference, Orlando, FL, Mar. 2008.

Cheung, Carol et al., "UAV-UGV Collaboration with a PackBot UGV and Raven SUAV for Pursuit and Tracking of a Dynamic Target". In Proceedings of SPIE Defense and Security Conference, Orlando, FL, Mar. 2008.

Schoenfeld. Erik et al., "Door Breaching Robotic Manipulator". In Proceedings of SPIE Defense and Security Conference, Orlando. FL, Mar. 2008.

Yamauchi, Brian. "Daredevil: Ultra Wideband Radar Sensing for Small UGVs", In Proceedings of SPIE: Unmanned Systems Technology IX, Orlando, FL, Apr. 2007.

Rudakevych, Pavlo et al, "Integration of the Fido Explosives Detector onto the PackBot EOD UGV", In Proceedings of SPIE vol. 6561, Mar. 2007.

Rudakevych, Pavlo et al., "A man portable hybrid UAV/UGV system", In Proceedings of SPIE vol. 6561, Mar. 2007.

Jones, Chris et al., "Sentinel: An Operator interface for the Control of Multiple Semi-Autonomous UGVs", In Proceedings of the Association for Unmanned Vehicles Systems International. Orlando, FL, Aug. 2006.

Yamauchi, Brian. "Autonomous Urban Reconnaissance Using Man-Portable UGVs", In Proceedings of SPIE: Unmanned Ground Vehicle Technology VIII, Orlando, FL, Apr. 2006.

Yamauchi, Brian. "Wayfarer: An Autonomous Navigation Payload for the PackBot", In Proceedings of AUVSI Unmanned Vehicles North America 2005, Baltimore, MD, Jun. 2005.

Barnes, Mitch et al., "ThrowBot: Design Considerations for a Man-Portable Throwable Robot", In Proceedings of SPIE vol. 5804, Mar. 2005.

Rudakevych, Pavlo et al., "PackBot EOD Firing System", In Proceedings of SPIE vol. 5804, Mar. 2005.

Yamauchi, Brian. "The Wayfarer Modular Navigation Payload for Intelligent Robot Infrastructure", In Proceedings of SPIE vol. 5804; Unmanned Ground Technology VII, Orlando, FL, Mar. 2005.

Yamauchi, Brian et al., "Griffon; a man-portable hybrid UGV/UAV", In Industrial Robot: An International Journal, vol. 31 No. 5, 2004.

Yamauchi, Brian. "PackBot: A Versatile Platform for Military Robotics", In Proceedings of SPIE vol. 5422: Unmanned Ground Vehicle Technology VI, Orlando, FL, Apr. 2004.

Sword, Lee et al.. "Mobility Enhancements for Ballistically Deployed Sensors". In Proceedings of SPIE vol. 4393, Apr. 2001.

Rudakevych, Pavlo. "Wave Control: A Method of Distributed Control for Repeated Unit Tentacles", In Proceedings of SPIE vol. 3839, Aug. 1999.

Rudakevych, Pavlo et al., "Micro Unattended Mobility System (MUMS)", In Proceedings of SPIE vol. 3713, Jul. 1998.

SafeStop™ Wireless Emergency Stop System brochure, TORC Technologies, LLC., copyright 2008, undated.

SafeStop™ User Manual, Revision 2.1, SafeStop™ ES-220 Wireless Emergency Stop, TORC Technologies, LLC., copyright 2007, undated.

De Campos, Institute of Electrical and Electronics Engineers, "Perception Planning as a Distributed Decision-Making Process," Oct. 17-20, 1993, vol. 3, pp. 611-616.

Corbett, G.K., et al., "A Human Factors Tested for Ground-Vehicle Telerobotics Research," *Southeastcon '90 Proceedings*, vol. 2, pp. 618-620, 1990.

Shimoga, et al., "Touch and Force Reflection for Telepresence Surgery," *IEEE*, pp. 1049-1050, 1994.

Mair, "Telepresence—The Technology and Its Economic and Social Implications," *IEEE*, pp. 118-124, 1997.

Ohashi et al., "The Sensor Arm and the Sensor Glove II—Haptic Devices for VR Interface," *IEEE*, p. 785, 1999.

Green, P.S., et al., "Telepresence Surgery," *IEEE*, Engeneering in Medicine and Biology, pp. 324-329, May/Jun. 1995.

Nakai, et al., "7 DOF Arm Type Haptic Interface for Teleoperation and Virtual Reality Systems," *Proceedings of the 1998 IEEE/RSJ INTL.* Conference on Intelligent Robots and System, pp. 1266-1271, 1998.

* cited by examiner

MULTI MODE SAFETY CONTROL MODULE

INTRODUCTION

This invention relates generally to circuits and assemblies for controlling the flow of power through a semi-autonomous mobile vehicle. In particular, embodiments of this invention relate to multiple mode control modules that control the flow of power through the electrical and mechanical systems included in a semi-autonomous vehicle according to a chosen mode, and a control module that further provides an emergency stop assembly for removing power from substantially all of the electrical and mechanical systems of the semi-autonomous vehicle.

BACKGROUND

Safety control systems are included in most process-controlled assemblies to provide the assemblies with the ability to shut down. Multiple types of safety systems exist. Emergency stop safety systems typically operate to remove power from the entire assembly, while other safety systems may stop the flow of liquid or gas, or otherwise stop the process being controlled. Emergency stop safety systems typically found in industrial applications are connected directly to the main system's source of power. Sensors included in the safety system are able to detect failure conditions within the assembly and responsively activate the safety system, which in turn removes power from the assembly.

Industrial applications that employ an emergency stop safety system rely on the system's ability to interact with the applications' components to stop current flow through the application and further safely redistribute all power out of the assembly. Furthermore, these applications typically integrate the components necessary to implement the emergency stop safety system into the larger process controlled application. Such a configuration can be disadvantageous because it provides no alternative to removing power from the entirety of the system. Additionally, safety systems that integrate the circuits and mechanical systems necessary to implement an emergency stop safety system can be application specific, not versatile, and require costly and often complicated installation.

Electro-mechanical systems similarly utilize emergency stop safety sub-systems that remove all power from the main system when an emergency event is detected. It may be inappropriate to design an autonomous vehicle that responds to an emergency event by removing power from all components within the autonomous vehicle. Such a design would fail to address the need for an autonomous vehicle to retain a level of autonomy despite encountering an emergency event that causes a power loss. Autonomous vehicles rely on control systems included within vehicle to continue collecting data and to further provide the user and vehicle with a system through which the autonomous vehicle can communicate.

SUMMARY

The present teachings provide a mobile vehicle comprising: mechanical components configured to operate the mobile vehicle in a manual mode of operation; a main power circuit in the mobile vehicle for distributing a power signal to the electromechanical components and to external modules installed on the mobile vehicle; an automation module connected to the mechanical components and operable to control and operate the mechanical components, and a power circuit configured to distribute power to the mechanical components and the external modules; a safety control module installed on the mobile vehicle and connected to the main power circuit, the automation module, and the mechanical components; a mode selector switch included in the safety control module and connected to the main power circuit; and emergency stop switches connected to corresponding emergency stop buttons and the mode selector switch, and configured to prevent a flow of current to substantially all of the mechanical components and external modules in response to actuation of the emergency stop buttons. An operational mode of the mobile vehicle changes in response to actuation of the mode selector switch.

The present teachings also provide a system for controlling the distribution of power within a mobile vehicle. The system comprises: mechanical components of the mobile vehicle configured to operate the mobile vehicle according to a user-defined mode of operation; a main power circuit of the mobile vehicle configured to transmit a power signal to the mechanical components and to external modules connected to the mobile vehicle; an automation assembly installed on the mobile vehicle, connected to the mechanical components and to the main power circuit, and configured to control and operate the mechanical components and distribute power from the main power circuit to the mechanical components; emergency stop buttons installed on the mobile vehicle and connected to emergency stop switches responsive to actuation of the emergency stop buttons; and a safety control module installed on the mobile vehicle and connected to the automation assembly, the mechanical components, the emergency stop buttons, and the main power circuit, the safety control module including a mode selector switch for altering the mobile vehicle's mode of operation.

The present teachings further provide a power control system comprising: a safety control module enclosed at least partially in a housing comprising mounts for mounting the safety control module to a surface, the housing also comprising connectors and plugs configured to mate with external assemblies and connect with circuits of the safety control module; a mode switch circuit having a mode selector switch designed to change an operative mode of the safety control module in response to actuation thereof, a main power circuit connected to a power source and configured to provide power to a central control assembly included in an external automation assembly; and an emergency stop switch configured to activate a shutdown process when actuated, the shutdown process removing power from a manual assembly, redirects a power signal provided to the automation assembly, and energizes the central control assembly. The mode switch circuit is configured to distribute power to the safety control module according to the operative mode.

Certain advantages of the present teachings will be set forth in part in the description which follows, and in part will be obvious from the description, or may be learned by practice of the present teachings. The advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate one several embodiments of the present teachings and, together with the description, serve to explain the principles thereof.

DETAILED DESCRIPTION

Figure 1:
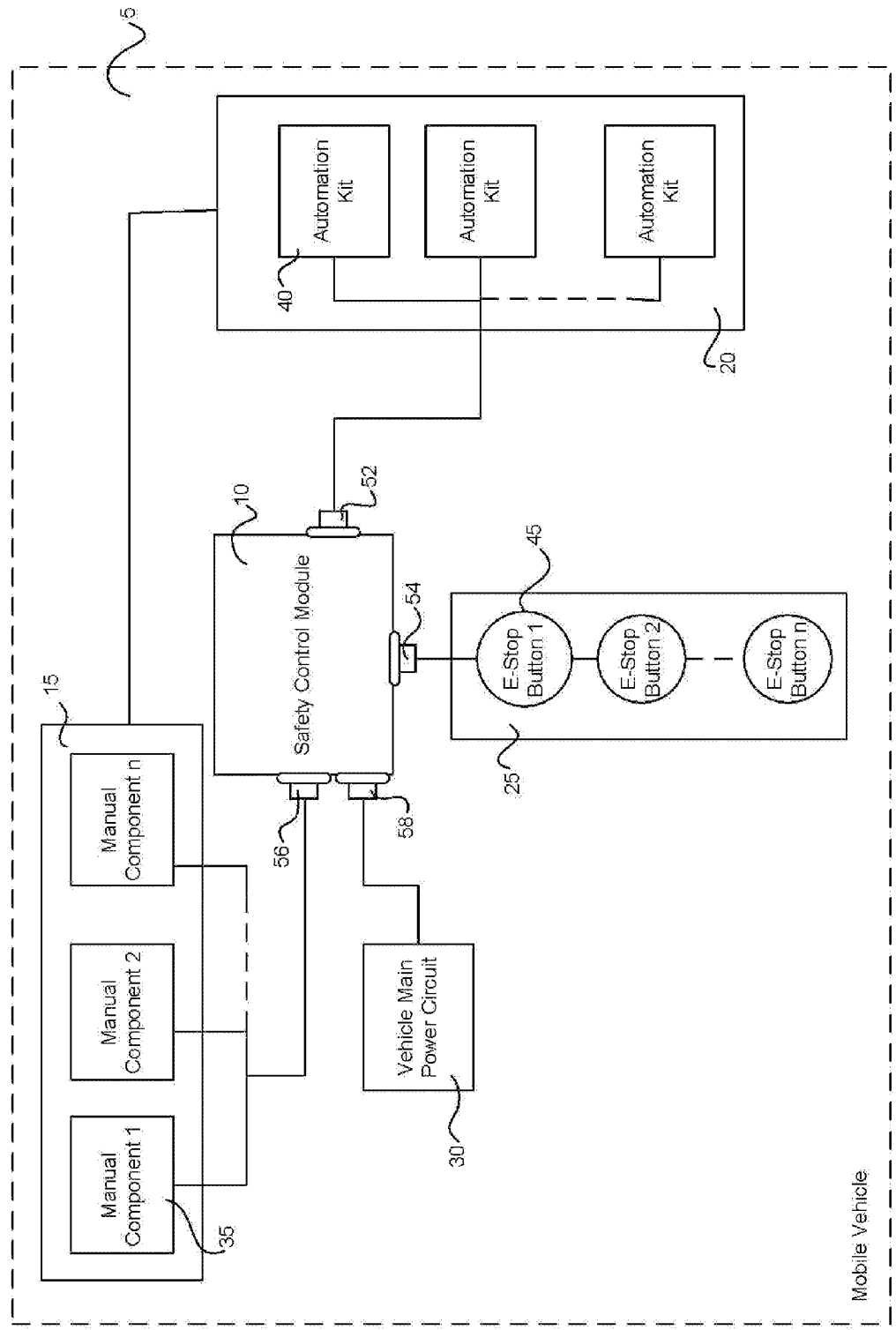
FIG. 1 is a block diagram of an exemplary embodiment of circuits and assemblies included in the mobile vehicle and their interconnections and connections with a safety control module.

Reference will now be made in detail to the present exemplary embodiments of the present teachings, examples of which are illustrated in the accompanying drawings.

The safety control module provides a system for controlling distribution of power throughout an automated vehicle. Included within the safety control module is an assembly of circuits and mechanical systems designed to distribute power to the modules and assemblies connected to the safety control module. In particular, the assembly of circuits and mechanical systems distribute power to mechanical systems included in the autonomous vehicle and necessary to operate the autonomous vehicle manually. These mechanical systems receive power from the safety control module when the safety control module operates in a manual mode. When operating in an automatic mode, the mechanical systems receive power in part from an automation assembly connected to the safety control module, and in part from the safety control module.

The safety control module provides a system for operating the circuits and mechanical assemblies included in the safety control module, the autonomous vehicle, and the modules and assemblies connected to the safety control module in a user-defined mode. Alteration of the mode of operation is accomplished by actuating a mode selection switch. When in an automatic mode, the safety control module distributes a power signal to an automation assembly connected to the safety control module, where the automation assembly further controls the operation of substantially all the systems included in the automated mobile vehicle to automate the operation of the vehicle and the assemblies connected to the vehicle.

The safety control module further provides a system for initiating an emergency shutdown of the vehicle and the vehicle's associated components when an emergency stop button connected to the safety control module is actuated. The emergency shutdown is facilitated by an emergency shutdown system configured to disrupt the flow of power to the electrical and mechanical systems included in the autonomous vehicle to shut down the vehicle and the vehicle's components.

The safety control module also provides a system for initiating an emergency shutdown of the vehicle and the vehicle's associated components while providing a minimum level of autonomy. Included in the safety control module is a main computer circuit powered directly by the vehicle's power source and unconnected to the emergency shutdown system. Connected to the main computer circuit is a central control assembly configured to record system data and further provide a control system able to communicate remotely with a user and provide a minimum level of autonomous control over the vehicle and its associated components.

The safety control module further provides a system where the safety control module is contained within a rugged housing such that the safety control module can be mounted on the surface of the vehicle and interface with the vehicle via a system of external cables and connectors.

Certain embodiments of the present teachings provide a safety control module used in combination with an automated mobile vehicle for responding to emergency events by removing power from all non-essential systems and assemblies while continuing to provide power to essential control systems within the vehicle's automation module. Mechanical assemblies installed in the mobile vehicle to facilitate manual operation of the vehicle can be connected to the safety control module such that when the safety control module operates in a manual operation mode, a user can operate the mechanical assemblies. Automation of the mobile vehicle can be accomplished by an automation module that includes an automation assembly connected to the mechanical assemblies in the mobile vehicle. The circuits and routines included in the automation module can be configured to operate and control various mechanical and electrical systems of the mobile vehicle such that the mobile vehicle operates autonomously according the automation module's circuits and routines.

In accordance with certain embodiments of the present teachings, the safety control module can comprise a safety control assembly including circuits and mechanical assemblies enclosed within a rugged housing. The housing can be rated for military or industrial use, can be configured to reduce heat and shield the internal safety control assembly from electromagnetic noise, and can be fitted with external mounts and rails to mount the safety control assembly to a surface. Optionally installed on the housing are a plurality of connectors and plugs, which can be rated for military or industrial use and can mate with a variety of communication links. Communication links can include wires and cables, but can alternatively include a wireless signal or other connection link able to relay signals from an external module or assembly to modules and assemblies included in the safety control module via a communication link connected to the safety control module via a connector or plug installed on the safety control module's housing.

In accordance with certain embodiments of the present teachings, installed within the safety control module is a mode selection circuit that includes a switch with positions corresponding to a predetermined number of, for example three, modes. These modes can include a manual mode of operation, an automatic mode of operation, and a reset mode of operation. When the switch in the mode selection circuit is actuated, the safety control module and the modules and assemblies connected to the safety control module, can operate according to the chosen mode. The manual mode of operation can, for example, enable a circuit configuration whereby the mechanical assemblies and electrical circuits included in the mobile vehicle and able to operate the vehicle manually, are powered via the vehicle's main power switch. Thus, while the safety control module is in a manual operation mode, a user is able to operate the mechanical assemblies and electrical circuits necessary to operate the vehicle manually. An automatic mode of operation can be characterized by autonomous operation of, for example, substantially all the mechanical assemblies and electrical circuits included in the mobile vehicle. The automatic mode can enable the assemblies included in the automation module to control the operation of the mobile vehicle according to stored routines and according to user and system commands.

In accordance with certain embodiments, the safety control module can further include a series of emergency stop (E-Stop) buttons and corresponding switches able to break the connection between the mode selection circuit and additional safety control module circuitry when actuated. Disrupting the connection between the mode selection switch and the circuits and assemblies included in the safety control assembly further causes a disruption of current to these circuits and assemblies. The net effect can be removal of power from the circuits and assemblies that are dependent on their physical connection with the mode selection circuit for power. Various embodiments contemplate a connection with the mode selection circuit characterized by a wire, while other embodiments may include an alternative physical connection such as an integrated circuit, or a non-physical connection established via an electrical pulse or created via a software routine configured to redistribute power throughout the safety control module.

In accordance with certain embodiments, removal of power accomplished via actuation of an E-Stop button serves to shut down substantially all systems included in the mobile vehicle and in assemblies and modules connected to the mobile vehicle, including the safety control module. Although the mobile vehicle may operate in a manual mode, certain embodiments of the robotic system may retain a level of autonomy after an E-Stop button is actuated. This level of autonomy can be accomplished by the main computer circuit, which can be directly connected to the vehicle's main power circuit, and which can also be connected to the central control circuit included within the automation assembly. The ability to communicate remotely with the vehicle and record essential system data associated with the emergency shutdown of the mobile vehicle can be facilitated by the central control circuit, which can remain powered by the main computer circuit despite the emergency shutdown.

Displayed in FIG. 1 is a block diagram illustrating an exemplary embodiment of connections between a safety control module 10 installed on an automated mobile vehicle 5 and additional modules and assemblies included on the mobile vehicle 5. The safety control module 10 can be, in certain embodiments, a stand-alone structure that includes a safety control assembly enclosed within a housing that is further fitted with connectors and plugs able to mate with external wires, cables, and other connection links. Each connector or plug included on the housing can be configured to mate with external cables with corresponding connectors, to establish a communicative connection between the safety control module 10 and the external modules or assemblies to which the external cables are linked. The connectors and plugs can be rated for industrial or military use to ensure that the connectors are both strong and durable. Other embodiments of the safety control module 10 may include a rugged housing able to accommodate a wiring interface whereby external modules and assemblies would be connected directly to the safety control module's internal circuits and assemblies. Still other embodiments may include a safety control assembly integrated directly into a mobile vehicle or other module or system. These embodiments would include a safety control assembly with connectors installed directly on the circuits and assemblies included in the safety control assembly. Still other embodiments may include an embodiment of the safety control module 10 where the circuits and assemblies included in the module are integrated directly into mobile vehicle, and do not include connectors or plugs. Further embodiments of the safety control module 10 may include connectors that are not rated for military or industrial use, or connectors and plugs that are alternatively or additionally chosen based on their ability to pass various levels of current.

According to certain embodiments of the present teachings, the vehicle's main power circuit 30 can be connected to the safety control module 10 via a power connector 58. This circuit 30 can be the power source for the mobile vehicle 5, the safety control module 10, the automation assembly 20, the manual assembly 15, and the emergency shutdown assembly 25. When the power switch included in the circuit 30 is in an "off" position, no current is passed to the circuits and assemblies connected to the main power circuit 30. The power connector 58 can, for example, be rated to accept voltages within a range of 12 volts to 48 volts. The connector 58 can, for example, be rated for military or industrial use and can include a locking mechanism configured to lock the connective cable's connector together with the power connector 58. Alternative embodiments of the safety control module 10 can include a power connector 58 comprising one of a ring terminal, a push-on terminal, a junction block, a spade terminal or another type of mechanical structure able to connect an external wire or cable to the safety control module 10.

Connectors can also be provided to connect the manual assembly 15 and the automation assembly 20 to the safety control module 10. The manual assembly connector 56 and the automation assembly connectors 52 can be rated for industrial or military use and can be connected to connection links included in the safety control assembly to establish a physical and electrical connection between the manual and automation assemblies and corresponding circuits in the safety control assembly. While the manual assembly connector 56 can be configured to transmit power signals, the automation assembly connectors 52 can be configured to transmit both power and data signals. Thus, the connection between the manual assembly 56 and the safety control assembly 10 can be a power connection where the circuits within the safety control assembly 10 distribute power to the manual assembly 56 according to the operative mode. Further, the connection between the automation assembly 20 and the safety control assembly 10 can be a power and data connection such that circuits within the safety control assembly 10 distribute power and data to the automation assembly 20 according to the operative mode and according to data generating events and statuses.

In accordance with certain embodiments of the present teachings, the manual assembly 15 and the automation assembly 20 can include one or more components. One or more manual components 35 included in the manual mode assembly 15 can correspond to the various electrical and mechanical assemblies included in the vehicle 5 to enable a user to operate the vehicle manually. Exemplary manual components 35 can include, for example: circuitry dedicated to a fuel shut-off solenoid; a steering motor; and a throttle assembly. These components can be powered and controlled by the automation assembly 20 when the vehicle 5 operates in an autonomous mode. However, when in a manual mode, the manual components 35 can be controlled by a user, and powered via a connection with a manual relay 224 included in the safety control module 10. The manual mode of operation can allow a user to operate the vehicle 5 as they would without robotic control and an emergency backup system. Alternative embodiments of the system can include a manual mode of operation allowing the automation assembly 20 to have semi-autonomous control over aspects of the vehicle's operation, while the user has control over other aspects.

Similar to the manual mode assembly 15, the automation assembly 20 can include a number of individual automation kits 40. The vehicle 5 can be fitted with a single automation assembly 40 able to control the operation of most of the vehicle's electrical and mechanical assemblies. The automation kits 40 can provide control circuits and routines able to automate operation of the vehicle and power the manual components 35 and other assemblies and systems included on the vehicle 5 and necessary to operating the vehicle 5 autonomously. Alternative embodiments of the vehicle 5 may include multiple kits 40, where each kit 40 is dedicated to controlling vehicle component subsets. Still other embodiments of the vehicle 5 can include additional kits 40 dedicated to the operation of manipulators and actuators installed on the vehicle 5, such as a head, an arm, or a movable neck.

In various embodiments, the emergency shutdown assembly 25 includes a string of emergency stop (E-Stop) buttons 45 that can be, for example, connected in series and configured to send an electrical pulse to the safety control module 54 when one of the buttons is depressed. Each button 45 can be connected to a switch so that when the button 45 is depressed, the switch is actuated. A connector 54 can be included on the safety control module 10 to connect the emergency shutdown assembly 25 to the safety control module 10. Inclusion of multiple E-Stop buttons 45 is optional and the connector 54 can include an industrial grade, spring-loaded contact that terminates and closes a circuit included within the safety control module 10 when no additional E-Stop buttons 45 are connected to the safety control module 10. Alternatively, the spring-loaded connector 54 can open the circuit and connect additional E-Stop buttons 45 when additional E-Stop buttons 45 are connected to the safety control module 10 via the connector 54. When connected, the E-Stop buttons 45 can be placed in series with an E-Stop switch 220 included in the safety control assembly of the safety control module 10.

Safety Control Module

In certain embodiments, the safety control module 10 can be a stand-alone system, fully enclosed within a rugged housing 305. Individual circuits and assemblies included within the safety control module and configured to receive signal inputs from external circuits and assemblies, can be connected to connectors and plugs 52, 54, 56, 58 that connect external wires and other communication links to the safety control module 10.

Figure 2:
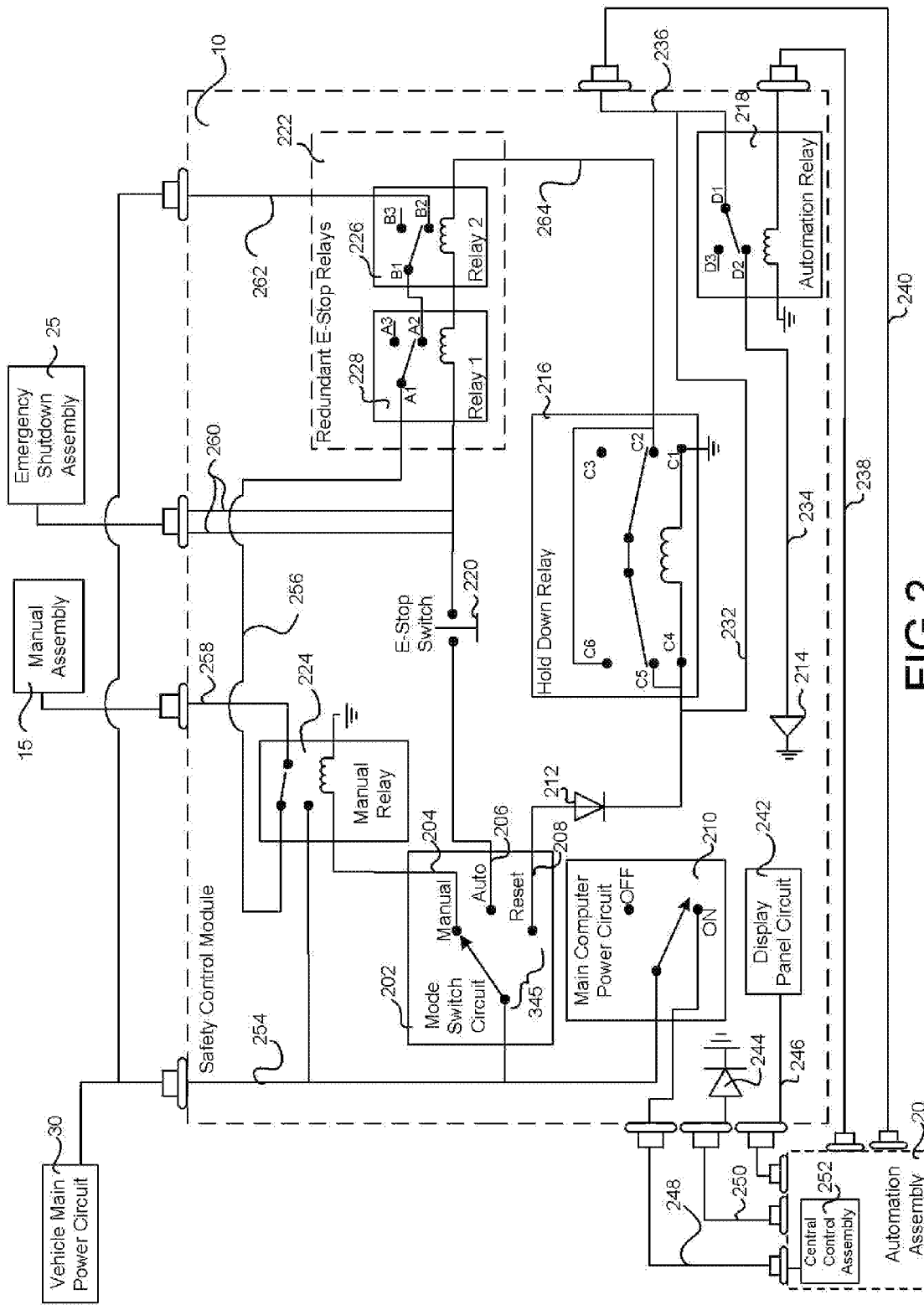
FIG. 2 is a schematic diagram of an exemplary embodiment of a safety control module in accordance with the present teachings.

An exemplary embodiment of the safety control module 10 is illustrated in FIG. 2. The mode switch circuit 202 installed at the center of the safety control module 10 can control the module's operative mode by re-distributing power throughout the circuits included within the safety control module 10 according to the chosen mode. Modes can be chosen via the mode selector switch 345, which can be, for example, a three-pin selector switch included within the mode switch circuit 202, and which can be operated by turning the switch's external dial installed on the front panel 350 of the safety control module housing 305. Each pin within the mode selector switch 345 can represent a different mode, and can include one or more of a manual mode pin 204, an automatic mode pin 206, and a reset pin 208. When the mode selector switch 345 is actuated via the switch's external dial, the safety control module's operative mode can be altered to a mode corresponding to the current chosen mode of operation.

In various embodiments, the mode switch circuit 202 can be connected directly to the vehicle's main power circuit 30 such that current flows from the vehicle's main power circuit 30 through the mode switch circuit 202 and further through the mode selector switch 345. When the mode selector switch 345 is actuated, the path of the current can be altered such that current flows through a chosen mode pin. An exemplary situation is one where the mode selector switch 345 is actuated so that an automatic mode is chosen. In this situation, current can flow from the vehicle's main power circuit 30, through the mode selector switch 345, to the automatic mode pin 206. Circuits and assemblies connected to the automatic mode pin 206 can therefore receive current when the switch 345 is an automatic mode.

In certain embodiments, a wire can connect the manual mode pin 204 to the manual mode relay 224. Within the manual mode relay 224, the wire can further connect the manual mode pin 204 to an inductance coil included within the manual mode relay 224. The manual mode relay 224 can be a normally open relay that closes a switch in response to a magnetic force created when the inductance coil is charged via the wire connecting the manual mode pin 204 to the manual mode relay 224. When closed, the switch can remain closed until current is removed from the inductance coil, further eliminating the magnetic flux and corresponding magnetic force. A counterforce generated by a spring or other type of force-storing component in response to the elimination of the magnetic flux can reposition the switch so that the relay returns to an open position.

In certain embodiments of the present teachings, the vehicle's main power circuit 30 can be connected to the manual mode relay 224 via a connecting wire 270 linking the power connector 58 to the closed position pin on the manual mode relay 224. A wire 256 can connect an open position pin on the manual mode relay 224 to the redundant E-Stop relay assembly 222. This configuration can operate so that when the manual mode relay 224 is open, the manual mode relay 224 is part of a circuit that includes all components connected to the automatic mode pin 206, and the manual mode assembly 15 can be powered by the power control circuits and assemblies included in the automation assembly. An alternative circuit can be created when the manual mode relay 224 is closed such that the vehicle main power circuit 30 is connected in series with the manual mode assembly 15. This circuit layout can allow the manual mode assembly 15 to be powered and controlled by an autonomous control system when the safety control module 10 is in an automatic mode. In a manual mode, however, the manual mode assembly 15 can be powered directly by the vehicle's main power circuit 30, so that the user is able to manually operate the vehicle.

As shown in the embodiment of FIG. 2, the automatic mode pin 206 can be connected to each of the E-Stop switch 220, the E-Stop button assembly 25, the redundant E-Stop relay assembly 222, the hold-down relay 216, and the automation relay 218. When the mode selector switch 345 is actuated such that the safety control module 10 is in an automatic mode, a closed circuit can be created that includes the vehicle main power circuit 30, the manual assembly 15, the emergency shutdown assembly 25, the automation assembly 20, the mode switch circuit 202, the main computer power switch circuit 210, the E-Stop switch 220, the redundant E-Stop relay assembly 222, the hold-down relay 216, and the automation relay 218. The resulting closed circuit can operate the mobile vehicle autonomously using the external control assemblies connected to the safety control module 10 via connectors included on the module's housing, and using the safety control module's internal circuits and assemblies.

The reset pin 208 can be connected to a diode 212 that is further connected to the hold-down relay 216. The diode 212 can be included in the path between the reset pin 208 and the hold-down relay 216 to ensure that current only flows from the reset pin 208 to the hold-down relay 216, which can prevent reverse energizing the reset pin 208 by discouraging current flow from the hold-down relay 216 to the reset pin 208. The reset pin 208 can be a momentary switch, meaning that when the switch is actuated, the switch's pin 208 returns to its normal position immediately after moving into a closed position. Thus, the reset pin 208 can be a momentary switch that is part of the larger mode selector switch 345, and is configured such that the reset pin 208 remains closed momentarily and immediately returns to an open position. Alternative embodiments of the safety control module 10 can include a reset pin 208 able to remain in a closed position for an indefinite period of time or until the switch is actuated to move the reset pin 208 back into the open position.

In certain embodiments, the hold-down relay 216 can be a latching relay with two states, which is configured to remain in an existing state when current is removed from the inductance coil. Elimination of the magnetic force produced by the charged inductance coil causes the relay's pins to remain in the position they were in immediately before current was removed. An example of this would be a normally open hold-down relay 216 that closes when current is applied to the hold-down relay 216 and remains closed when current is removed from the hold-down relay 216. The hold-down relay 216 can be connected to the reverse-energizing prevention diode 212 via, for example, a wire connecting the diode 212 to the C4 pin on the hold-down relay 216. The C5 pin on the hold-down relay 216 can be tied to the output of the C4 pin via, for example, a wire, while the C6 pin can be tied to the output of the C2 pin via, for example, a wire. The redundant E-Stop relay assembly 222 can be connected to the hold-down relay 216 via, for example, a wire connected from the output of the inductance coil in Relay 2 226 in the redundant E-Stop relay assembly 222. The automation relay 218 can be connected to the hold-down relay 216 via, for example, a wire connecting the C3 pin of the hold-down relay 216 to the D1 pin included in the automation relay 218.

In various embodiments, the hold-down relay 216 can route power through the safety control module 10 according to the chosen mode of operation and according to whether or not the emergency stop system has been activated. The hold-down relay 216 can be a normally open relay that closes when a current is passed through the inductance coil. The inductance coil in the hold-down relay 216 can receive current from an output wire 264 originating in the E-Stop relay assembly 222. Actuating the E-Stop switch 220 or an adjunct E-Stop button included in the emergency shutdown assembly 25 can cause the relays included in the E-Stop relay assembly to close and can generate a current that energizes the inductance coil in the hold-down relay 216. The hold-down relay 216 can respond to activation of the emergency shutdown system by removing power from the automation assembly 20.

Referring to the embodiment of FIG. 2, the emergency shutdown system can include the emergency shutdown assembly 25, E-Stop buttons 45 included in the emergency shutdown assembly 25, the E-Stop switch 220, and the redundant emergency stop (E-Stop) relay assembly 222. The E-Stop switch 220 can be connected on one end to the automatic mode pin 206 in the mode switch circuit 202, and at the other end to the emergency shutdown assembly 25. Each E-Stop button 45 included in the emergency shutdown assembly 25 can be, for example, a switch that is connected in serial to both prior and subsequent E-Stop buttons 45. What results is a string of emergency stop switches starting with the E-Stop switch 220, where the serial string of switches is connected at one end to the automatic mode pin 206 in the mode selector switch 345, and at the other end to Relay 1 228 of the redundant E-Stop relay assembly 222. In the automatic mode of operation, power can flow from the vehicle main power circuit 30 through the automatic mode pin 206, and through the serial string of emergency stop switches to Relay 1 228. Furthermore, in the automatic mode of operation, the inductance coils of Relay 1 228 and Relay 2 226 of the redundant E-Stop relay assembly 222 can be energized such that each relay's switch is closed, creating a circuit whereby the manual mode relay 230 can receive power from the vehicle main power circuit 30 to power the manual mode assembly 15 via the circuit created by the closed emergency stop relays 228, 226.

Actuation of the E-Stop switch 220 or any one of the emergency stop buttons 45 while in the automatic mode of operation, can break the physical and electrical connection between the automatic mode pin 206 and the redundant E-Stop relay assembly 222. The resulting open circuit can therefore be unable to energize the inductance coils included in Relay 1 228 and Relay 2 226, causing the relays 228, 226 to open and further breaking both the physical and electrical connection created by the wire 262 connecting the main power circuit 30 to the E-Stop relay assembly 222, and the wire 256 connecting the A1 pin of relay 1 228 to the manual relay 224. This break can stop the flow of current to the manual relay 224 and to the manual assembly 15. Thus, by actuating an E-Stop switch, power can be removed from the manual components included in the vehicle 5. This configuration can provide a circuit where actuation of an emergency stop button or switch causes power to be removed from all electrical and mechanical systems included in the vehicle. Furthermore, the configuration can allow the user to install multiple emergency stop buttons on the vehicle, and to have a level of control over the placement of those emergency stop buttons.

In certain embodiments, the mechanical assemblies included in the vehicle 5 can be designed to include mechanical safety systems that "fail safe" when power is removed from the mechanical assemblies. An example would include a mechanical clutch that implements a safety brake when power is removed from the vehicle 5. In this example, when an E-Stop button is depressed, power is removed from the manual assembly 15 and further from the mechanical components and assemblies 35 included in the manual assembly 15. When this occurs, the mechanical clutch would activate the mechanical safety brake, which would retard movement of the vehicle 5 and eventually cause the vehicle 5 to stop moving. Alternative embodiments can include a safety control module 10 that includes mechanical assemblies for retarding motion of the vehicle 5 when the emergency shutdown system is activated.

The following example illustrates an exemplary embodiment of an operation of the emergency stop assembly. An emergency stop button is installed next to a steering wheel and on a navigation console included in the mobile vehicle 5. The emergency stop button is included in the emergency shutdown assembly 25, which is in series with the E-Stop switch 220. While in the automatic mode of operation, a user depresses the emergency stop button which causes the attached switch to open thereby creating a break in the connection between the E-Stop switch 220 and relay 1 228. The break can cause the inductance coil in Relay 1 228 to de-energize, which can cause the inductance coil in Relay 2 226 to de-energize. In response to the elimination of the magnetic field in Relay 1 228 and Relay 2 226, each relay's switch moves from the energized position of A2, B2 to the deenergized position of A3, B3. The movement of Relay 1's switch to the A3 pin position and Relay 2's switch to the B3 pin position creates an open circuit where current no longer flows from the vehicle main power circuit 30 to the manual mode relay 230 via wires 262 and 256. The resultant open circuit removes power from the wire 258 connecting the manual mode assembly 15 to the safety control module 10, which further removes power from the components included in the manual mode assembly 15.

Removing current from the inductance coils included in the relays included in the redundant E-Stop relay assembly 222, per the above exemplary operation embodiment, further causes current to be removed from the C2 pin in the hold-down relay 216. In the automatic mode of operation, the hold-down relay 216 is energized such that the relay 216 is closed. The hold-down relay 216 can be a normally open relay that returns to the open position when current is removed from the inductance coil included in the hold-down relay 216. The open position is characterized by a position in which the switches contact the C3 and C6 pin. When the hold-down relay 216 moves to the open position, power is removed from the C2 pin and the C5 pin. Tied to the C5 pin via a wire is the C4 pin, which is further connected to the inductance coil included in the hold-down relay 216 and the wire 232 connecting the D1 pin of the automation relay 218 to the hold-down relay 216. Removal of power to the C4 pin de-energizes the inductance coil included within the hold-down relay 216, and removes current from the automation relay 218. Removal of current from the automation relay 218 causes the switch in the automation relay 218 to open or more specifically to move to the D3 position. When in the D3 position, digital signals can no longer pass from the automation assembly 20 to the automation relay 218, thereby causing the automatic mode LED 214 to power down.

In certain embodiments, the automation assembly 20 can include a central control assembly 252 comprising control circuits necessary to retain a minimum level of autonomy when the emergency shutdown system is activated. In such an embodiment, connected to the central control assembly 252 is a wire 248 connected through a connector on the automation assembly 20 to the central control assembly 252, and further connected to the on position of the main computer power switch in the main computer power circuit 210 via a connector 52 installed on the safety control module's housing. The main computer power circuit 210 can include a main computer power switch connected to the vehicle main power circuit 30 via an internal wire 254 such that when the vehicle is powered, the computer power circuit 210 can distribute power to assemblies connected to the computer power switch. In particular, when the vehicle 5 is powered and the switch included in the main computer power circuit 210 is in an on position, the central control assembly 252 can be powered. The main computer power circuit 210 may not be connected to the emergency shutdown system, and so when the emergency shutdown system is activated, the main computer power circuit 210 remains unaffected. This configuration can ensure that a control circuit will remain powered despite an emergency shutdown and provided that the vehicle's main power switch remains in an on position. Ensuring operation of the central control assembly 252 can provide the vehicle 5 and the user with a minimum level of autonomy. This autonomy can allow the user to communicate with the vehicle 5 despite an emergency shutdown, and can provide data indicative of the status of the vehicle's systems by allowing the central control assembly 252 to operate a communication system and further record and store system data. Alternative embodiments of the system can include a central control assembly 252 that can mobilize mechanical assemblies, reset the safety control module 10, or provide some other autonomous ability.

Further connected to the automation assembly 20 via connectors 52 installed on the housing 305 is, for example, an LED 244 connected via a wire 250 installed between the automation assembly 20 and the LED 244. The LED 244 can be installed on the safety control module 10 and can be configured to illuminate when the computer power switch included in the computer power circuit 210 is in an on position. Also connected to the automation assembly 20, for example via a wire 246, is a display panel circuit 242 able to accept data sent to the display panel circuit 242 from the automation assembly 20 regarding the state of various systems installed in the vehicle 5. This status data can be displayed to the user via displays 315 installed on the safety control module display face 350. Exemplary systems monitored by the display panel circuit 242 can include the vehicle engine oil pressure sensor, the vehicle water temperature sensor, and the vehicle gear oil temperature sensor.

Operation of the Safety Control Module

Figure 3:
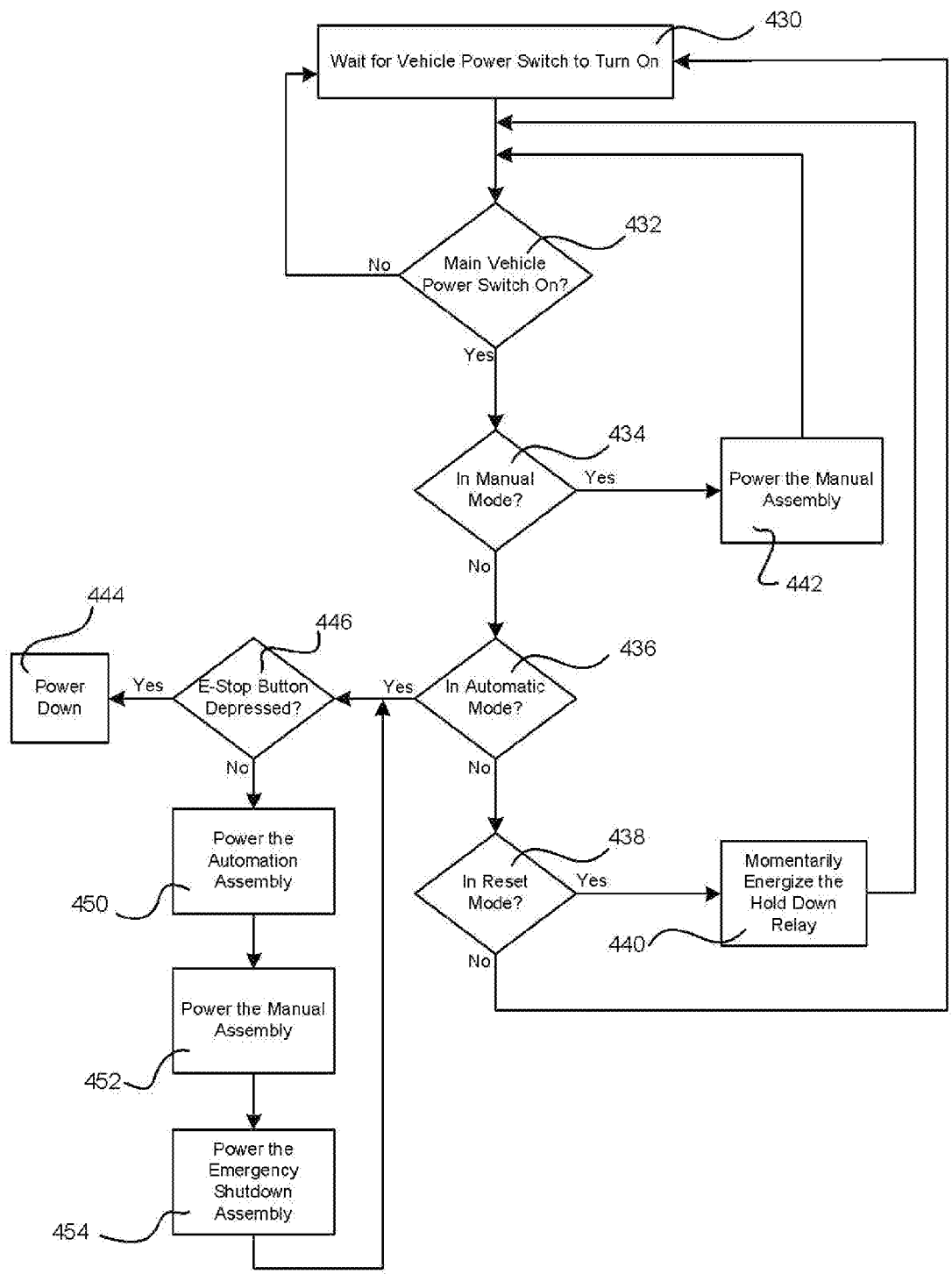
FIG. 3 is a flow diagram depicting an exemplary embodiment of a flow of power through the safety control assembly.

FIG. 3 is a flow diagram depicting an exemplary embodiment of a flow of current through a safety control module 10 when the module operates in one of the operational modes. Flow of current through the safety control module 10 can be based in part on the state of the circuits and assemblies included in the safety control module 10, and based in part on the presence of a voltage source. The safety control module 10 can be responsive to positional changes of the mode selector switch 345 when the main vehicle power switch is on 432. Operation of the safety control module 10 can be partly dependent on the power source made available when the main vehicle power switch included in the vehicle main power circuit 30 is on, and the module waits until the power switch is in an on position 430 to resume operation. When a voltage is present in the safety control module 10, the mode switch circuit 202 and the circuits and assemblies connected to the mode switch circuit 202, can be responsive to a mode change accomplished via actuation of the mode selector switch 345. The manual relay 224 can check whether the switch is in the manual mode of operation 434, and can direct power to the manual assembly 442 when the switch is in a manual mode position.

In various embodiments of the present teachings, the circuits and assemblies connected to the automatic mode pin 206 can be responsive to a change in mode to the automatic mode of operation. When the mode selector switch changes position to the automatic mode position, the circuits and assemblies connected to the automatic mode pin 206 through the serial string created by the E-Stop switch 220 and the emergency shutdown assembly 25 can be responsive to the position change when all E-Stop buttons and their corresponding switches remain lifted and are not depressed or actuated. When any one of the E-Stop buttons in the E-Stop button chain created by the E-Stop switch 220 and the emergency shutdown assembly 25 is depressed, power can be diverted from the E-Stop relay assembly 222, causing all circuits and assemblies within the safety control module 10 and connected to the safety control module 10 to power down.

Also shown in FIG. 3, after checking whether or not an E-Stop button is depressed 446, a path can be created from the automatic mode pin 206 to the redundant E-Stop relay assembly 222 through which current may pass. This path can remain present while all E-Stop buttons remain lifted, the power signal originating from the vehicle main power circuit 30 can be transmitted through the E-Stop relay assembly 222 to both the hold-down relay 216 and the manual relay 224. The hold-down relay 216 transmits the signal to the automation relay 218, which can transmit the signal to the automation assembly 20 causing the assembly 20 to be powered 450. The manual relay 224 can transmit the power signal to the manual assembly 15 to power the manual assembly 452. In certain embodiments, installed between the mode switch circuit 202 and the E-Stop relay assembly 222 are the E-Stop switch 220 and the emergency shutdown assembly 25, which are powered by the transmitted power signal 454.

When not in manual mode 434 and not in automatic mode 436, the hold-down relay 216 can be responsive to a change in the mode selector switch's position to a reset mode position. If a reset mode position is sensed 438, a power signal can be transmitted to the hold-down relay 216 causing the relay's switches to change position. The reset mode pin 208 can be a momentary switch that returns to the automatic mode position immediately after the power signal is transmitted to the hold-down relay 216. Should the switch not be in a reset position, the circuits in the safety control module 10 can continue to wait for the vehicle power switch to turn on 430 and periodically check whether this switch is on 432. At any point in time, power flow to any one of these components can be interrupted by a change in position of the mode selector switch 345. Response to a change in mode can be substantially instantaneous.

While FIG. 3 illustrates an exemplary method of distributing power through the safety control module 10 using circuits and assemblies, an alternative embodiment of the safety control module 10 can use a microprocessor or other control circuit to accomplish the logical decision-making processes accomplished by the safety control module 10. In such and embodiment, a microprocessor, microcontroller, single board computer, logical gate array, or other control unit can input power from the vehicle's main power circuit 30 and distribute the power according to the mode of operation, the state of the emergency stop button, and the state of the main power switch circuit 210.

Figure 4:
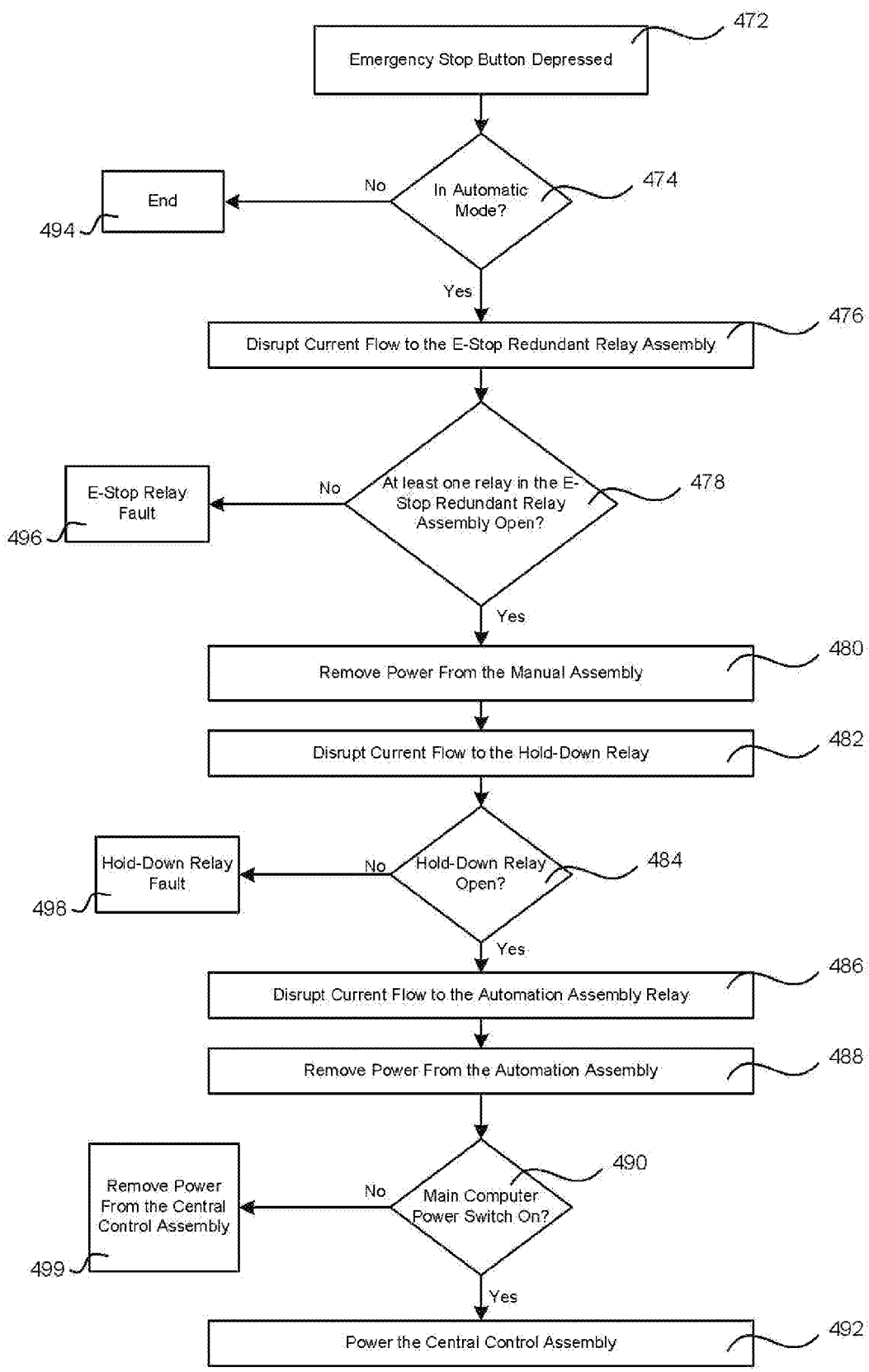
FIG. 4 is a flow diagram illustrating an exemplary embodiment of a method implemented when an emergency stop button is depressed.

FIG. 4 is a flow diagram of events that can occur following actuation of an emergency stop button at step 472. When any one of the emergency stop buttons are depressed and the button's corresponding switch is activated, the connected circuits can check the state of the mode selector switch 345 to verify that the module 10 is operating in an automatic mode 474. If the module 10 is not in the automatic mode, then no action is taken 494. Otherwise, when in automatic mode, the flow of current to the E-Stop relay assembly 220 can be disrupted 476, causing the switches included in the assembly's relays to change position. When the module 10 detects that neither of the relays included in the E-Stop relay assembly changed position 478, an E-Stop relay fault can be generated 496. If at least one of the relays included in the E-Stop relay assembly changes position to an open position, an open circuit can be created, removing power from the manual mode assembly 480 and disrupting current flow 482 to the hold-down relay 216. Disruption of current flow 482 to the hold-down relay 216 can cause the switches included in the hold-down relay to change position. If the switches fail to change position 484, a hold-down relay fault can be generated 498. When the hold-down relay 216 switch properly changes position to an open position, current flow to the automation assembly relay can be disrupted 486, causing power to be removed from the automation assembly 488. A check can be performed to determine whether the main computer power switch in the main computer power switch circuit is closed and in an on position 490. If the switch is closed, the central control assembly 252 in the automation assembly 20 can be energized 492 with power redistributed by the main computer power switch circuit 210. When the main computer power switch is open and no current is flowing into the main computer power switch circuit 210, power can be removed 499 from the central control assembly 252.

Alternative embodiments of the safety control module 10 can include a central processor configured to execute a routine that substantially emulates the logical process represented by the flow diagram in FIG. 4. This embodiment of the module 10 can include a central control circuit able to execute a stored software routine able to respond to depression of an emergency stop button by carrying out steps substantially similar to those carried out by the circuits and assemblies included in the safety control module 10.

Figure 5:
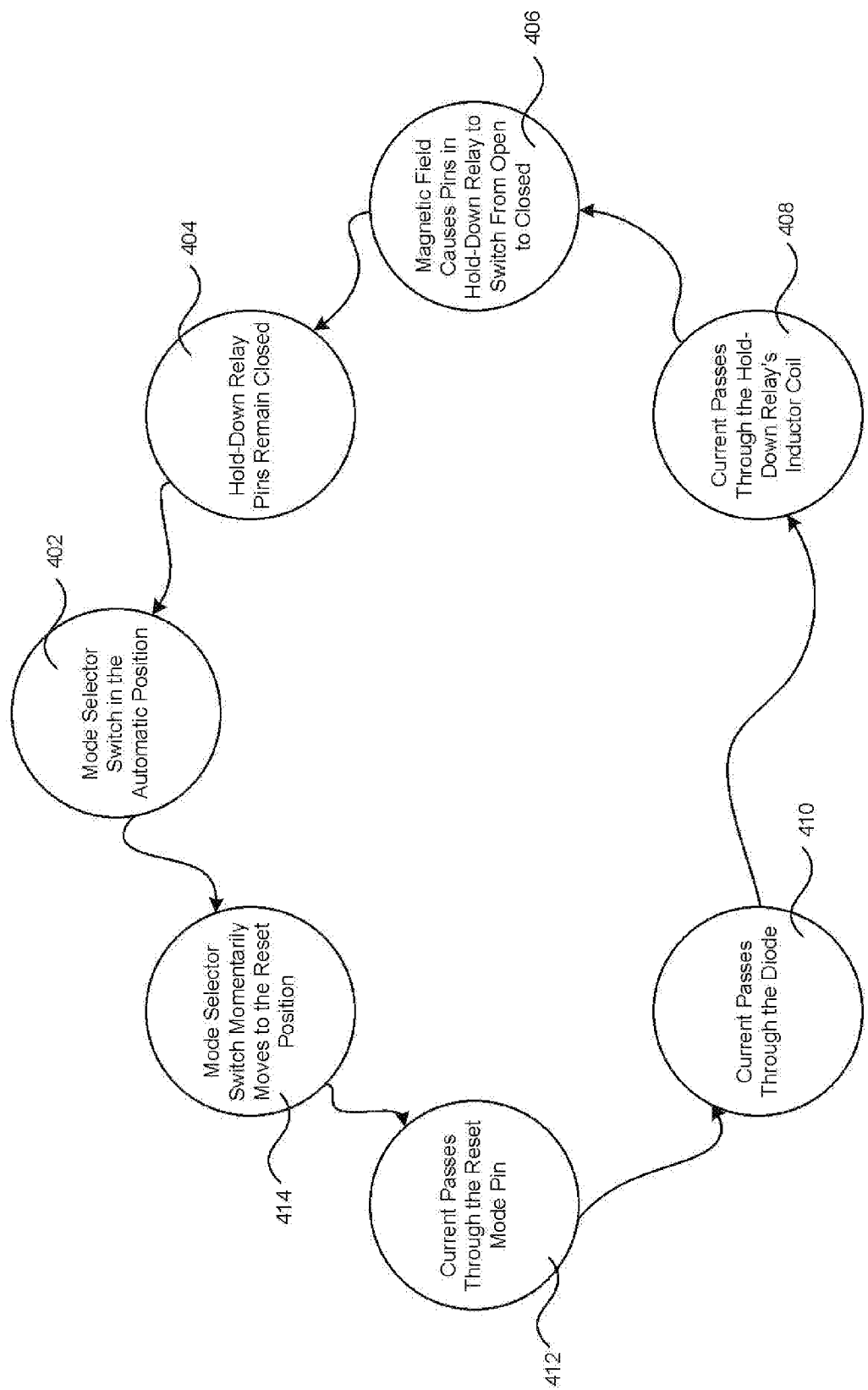
FIG. 5 is a flow diagram illustrating an exemplary embodiment of a method implemented when the reset mode is chosen.

FIG. 5 illustrates an exemplary method by which the reset mode can reset the state of the hold-down relay 216. When the mode selector switch 345 is moved to the automatic position 402, the switch 345 is in a position from which it can momentarily move to the reset position 414. The reset pin 208 is a momentary switch that can remain in the reset position for a very short period of time before returning the mode selector switch 345 to the automatic mode position. While the mode selector switch 345 is in the reset position, current can pass from the vehicle main power circuit 30 voltage source through the mode switch circuit 202 through the reset mode pin 412 as an instantaneous pulse of current. A connection wire installed between the reset mode pin 208 and the reverse energizing prevention diode 212 can transmit instantaneous pulse through the diode 410 to the hold-down relay 216 to energize the hold-down relay's inductance coil 408. A magnetic field can be created when a current passes through the inductance coil. This magnetic field can cause the pins in the hold-down relay's switch to change positions from an open position to a closed position 406. The hold-down relay 216 can be a latching relay, meaning that the relay retains is most recent position when current is removed from the relay's inductance coil. The instantaneous pulse can exist for a minimum time duration needed to cause the relay 216 to close, and a minimum time period needed to ensure that the relay 216 remains in a closed position 404.

Alternative embodiments of the safety control module 10 can implement the exemplary reset method illustrated in FIG. 5 using a central control circuit configured to execute a software routine able to substantially reproduce the method steps outlined in FIG. 5. Such embodiments of the safety control module 10 can include a microprocessor, microcontroller, single board computer, logical gate array, or other control unit able to execute a stored software routine able to reset the hold-down relay 216.

Safety Control Module Housing and Mounting

Figure 6A:
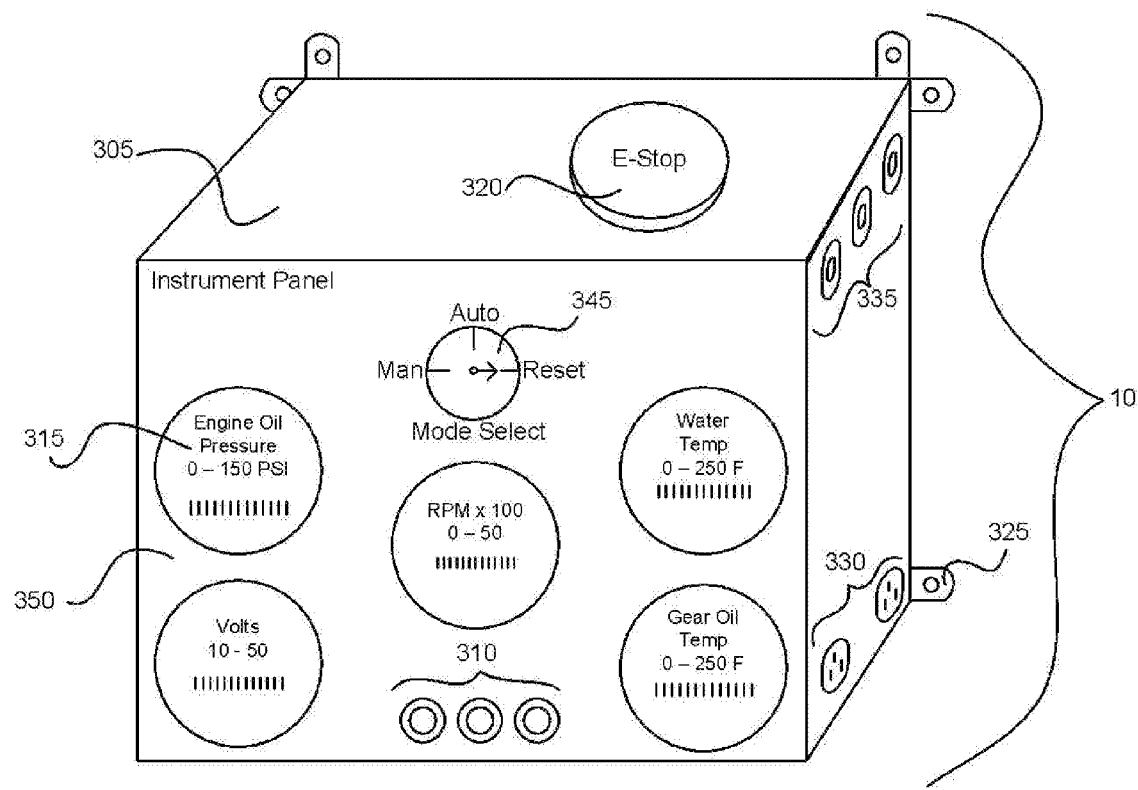
FIG. 6A illustrates an exemplary embodiment of a safety control module housing and display panel in accordance with the present teachings.
Figure 6B:
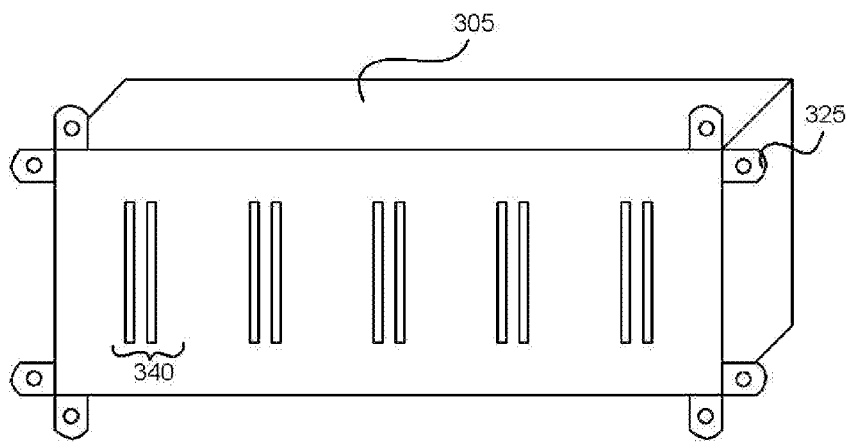
FIG. 6B illustrates an exemplary embodiment of mounting brackets included on a safety control module base in accordance with the present teachings.

A rugged housing 305 can encase the internal components of the safety control module 10 so that the safety control module 10 can be installed as a stand-alone component. An exemplary embodiment of a housing 305 is illustrated in FIG. 6A, and comprises industrial- or military-rated material providing a significant amount of protection to the internal components of the safety control module 10. The housing 305 can be sealed according to industrial and military specifications, to prevent liquids and particles from entering the housing internal chamber. Proper ventilation can be included via a mechanical vent assembly to facilitate the movement of air through the housing internal chamber, and to prevent overheating the safety control module's internal circuits and assemblies.

Figure 7:
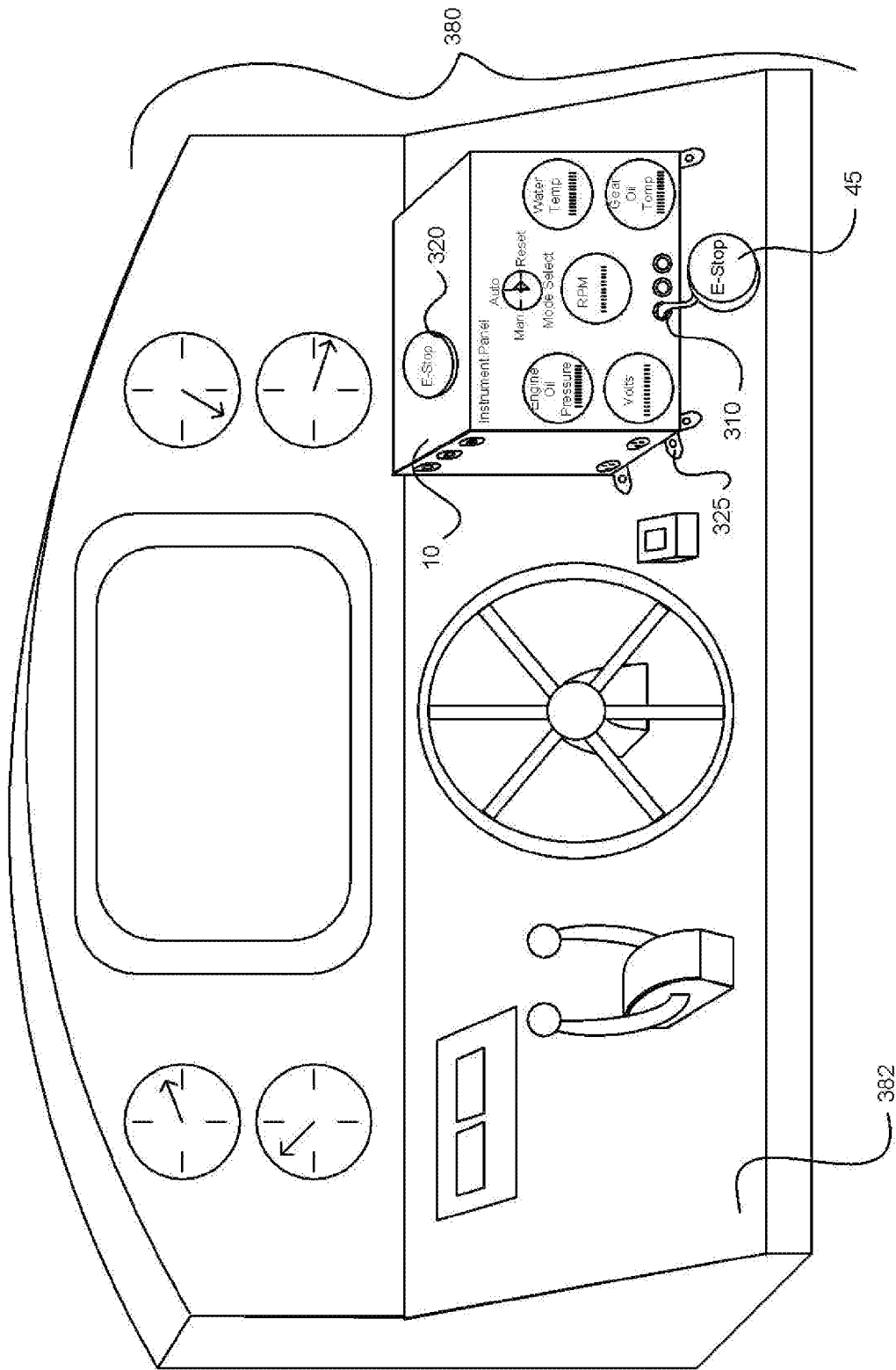
FIG. 7 illustrates an exemplary embodiment of a safety control module mounted to a dashboard of a mobile vehicle.

In certain embodiments, installed proximate to edges of the rugged housing 305, are mounts 325 for mounting the safety control module 10 to a surface. The mounts 325 can comprise a rounded plate fused to the rugged housing 305, having an indentation through which a fastener can be placed. An exemplary use of the mounts 325 is shown in FIG. 7, where the safety control module 10 is mounted to a dashboard 382 of a mobile vehicle. In this exemplary embodiment, the mounts 325 can be placed flush with the dashboard 382, and a fastener can be placed into each mount's indentation and drilled into a surface of the dashboard 382 to anchor the mount 325 to the dashboard surface. The mounts 325 can provide stability and support to the safety control module 10 by fastening the housing 305 to an additional surface. Fastening can be accomplished with one or more of screws, nails, clips, or any other mechanical component able to anchor the rugged housing 305 to a surface via the mounts 325.

Referring to FIG. 6A, the safety control module 10 can comprise an instrument display panel 350 installed within the housing 305, external to the module's internal circuits and assemblies. The instrument display panel 350 can include a mode selector dial and switch 345 included in the mode switch circuit 202. Each mode can be represented as a position on the mode selector dial, and choosing a mode of operation can require the user to turn the dial 345 to the preferred mode.

In various embodiments of the present teachings, the instrument display panel 350 can comprise displays 315 configured to display the status of assemblies included in the vehicle 5. The displays can be installed within the housing 305 and the instrument display panel 350, and can be connected internally to the display panel circuit 242. Each display 315 can correspond to a separate and distinct electromechanical assembly included in the vehicle 5, and can change state according to output from the display panel circuit 242. Exemplary displays include those that display the vehicle's engine oil pressure, water temperature, gear oil temperature, and engine rpms.

In certain embodiments, included on the instrument panel display 350 are connectors 310 able to mate with external connectors and provide a physical and electrical connection between an external assembly and the safety control module 10. Additional connectors 335 and plugs 330 can be installed on the surface of the housing 305. Each of the connectors 335 and plugs 330 can be configured to mate with external connectors and plugs and provide a physical and electrical connection between an external assembly and the safety control module 10. The connectors and plugs can be installed according to industrial or military specifications, and can be industrial or military rated connectors and plugs. The emergency stop button 320 connected to the E-Stop switch 220 included in the safety control module 10 can be mounted to the top of the housing 305. When the E-Stop button 320 is depressed, the E-Stop switch 220 can be actuated and the emergency stop system can be further activated to remove power from substantially all of the assemblies included within the vehicle 5.

While the illustrated exemplary rugged housing 305 is substantially rectangular in shape, alternative housing shapes may be used, including round, triangular, square, or any other shape able to enclose and provide structure to the internal components of the safety control module 10. Other embodiments of the safety control module 10 may not include a housing 305, but rather may include internal safety control module components integrated directly with the internal electromechanical components of the mobile vehicle.

FIG. 4B illustrates a bottom panel of the housing 305. To further provide support and to ensure versatility, the bottom panel can be fitted with mounting brackets comprising rails 340. The rails 340 can be configured according to the specifications for commercial rails such as, for example, Picatinny rails. The rails 340 can alternatively or additionally include custom sized and configured rails able to mate with a corresponding rail assembly. Other embodiments of the safety control module 10 can comprise a housing 305 that does not have an additional mounting or rail system installed along the housing's bottom panel.

An exemplary dashboard 382 and safety control module 10 assembly are display in FIG. 5. This illustration depicts a control console 380 installed in a mobile vehicle and comprising a display panel, gauges, a throttle, a steering wheel, and other components typically included on a mobile vehicle's control console 380. The safety control module 10 is mounted to the console's dashboard 382 via the mounts 325 included on the housing 305. An additional E-Stop button 45 is installed on the dashboard 382 and is connected to the safety control module 10 via an external connector 310. The E-Stop button 45 is included in the E-Stop button assembly 25 and is connected in series with the E-Stop button 320 mounted to the top of the safety control module 10. The E-Stop button 45 is also connected internally to the E-Stop switch 220. When the E-Stop button 45 is depressed, the emergency stop system can be activated creating an open circuit and further removing power from substantially all of the vehicle's electro-mechanical assemblies.

Other embodiments of the present teachings will be apparent to those skilled in the art from consideration of the specification and practice of the embodiments disclosed herein. It is intended that the specification and examples be considered as exemplary only, with a true scope and spirit of the teachings being indicated by the following claims.

What is claimed is:
1. A mobile vehicle, comprising:
mechanical components configured to operate the mobile vehicle in a manual mode of operation;
a main power circuit in the mobile vehicle for distributing a power signal to the electro-mechanical components and to external modules installed on the mobile vehicle;
an automation module connected to the mechanical components and operable to control and operate the mechanical components, and a power circuit configured to distribute power to the mechanical components and the external modules;
a safety control module installed on the mobile vehicle and connected to the main power circuit, the automation module, and the mechanical components;
a mode selector switch included in the safety control module and connected to the main power circuit; and
emergency stop switches connected to corresponding emergency stop buttons and the mode selector switch, and configured to prevent a flow of current to substantially all of the mechanical components and external modules in response to actuation of the emergency stop buttons,
wherein an operational mode of the mobile vehicle changes in response to actuation of the mode selector switch, and
wherein the automation module comprises a central control assembly connected to a main computer circuit and configured to receive a power signal from the main computer circuit, and the main computer circuit is configured to receive the power signal from the main power circuit and distribute the power signal to the central control assembly.

2. The mobile vehicle of claim 1, wherein the mechanical components are connected to electrical circuits.

3. The mobile vehicle of claim 1, wherein the main computer circuit continues to distribute current to the central control assembly in response to actuation of an emergency stop button.

4. A system for controlling the distribution of power within a mobile vehicle, the system comprising:
- mechanical components of the mobile vehicle configured to operate the mobile vehicle according to a user-defined mode of operation;
- a main power circuit of the mobile vehicle configured to transmit a power signal to the mechanical components and to external modules connected to the mobile vehicle;
- an automation assembly comprising a central control assembly, installed on the mobile vehicle, connected to the mechanical components and to the main power circuit, and configured to control and operate the mechanical components and distribute power from the main power circuit to the mechanical components;
- a main computer circuit configured to receive the power signal from the main power circuit and distribute the power signal to the central control assembly;
- emergency stop buttons installed on the mobile vehicle and connected to emergency stop switches responsive to actuation of the emergency stop buttons; and
- a safety control module installed on the mobile vehicle and connected to the automation assembly, the mechanical components, the emergency stop buttons, and the main power circuit, the safety control module including a mode selector switch for altering the mobile vehicle's mode of operation.

5. The system of claim 4, wherein the mechanical components are connected to control circuits.

6. The system of claim 4, wherein the emergency stop switches are configured to disrupt a flow of current to the mechanical components and the automation assembly in response to actuation of the emergency stop buttons.

7. The system of claim 6, wherein the central control assembly retains power in response to actuation of the emergency stop buttons.

8. A power control system comprising:
- a safety control module enclosed at least partially in a housing comprising mounts for mounting the safety control module to a surface, the housing also comprising connectors and plugs configured to mate with external assemblies and connect with circuits of the safety control module;
- a mode switch circuit having a mode selector switch designed to change an operative mode of the safety control module in response to actuation thereof;
- a main power circuit connected to a power source and configured to provide power to a central control assembly included in an external automation assembly; and
- an emergency stop switch configured to activate a shutdown process when actuated, the shutdown process removing power from a manual assembly, redirects a power signal provided to the automation assembly, and energizes the central control assembly,
- wherein the mode switch circuit is configured to distribute power to the safety control module according to the operative mode.

* * * * *